United States Patent Office

3,554,728
Patented Jan. 12, 1971

1

3,554,728
PROCESS FOR MAKING NON-HYGROSCOPIC AMMONIUM PHOSPHATE
William Percy Moore and James Earl Sansing, Chester, and Joseph Novotny, Hopewell, Va., assignors to Allied Chemical Corporation, New York, N.Y., a corporation of New York
No Drawing. Filed Aug. 5, 1968, Ser. No. 749,955
Int. Cl. C05b 7/00
U.S. Cl. 71—33    9 Claims

ABSTRACT OF THE DISCLOSURE

Wet process phosphoric acid is removed from an acidic sludge which settles from the crude acid and is concentrated to superphosphoric acid. The superphosphoric acid is then mixed with aqueous ammonia at a temperature greater than 70° C. whereupon the mixture is then held at 45–65° C. until at least 5% solids precipitate. The precipitated solids are neutralized to pH 5–6 with the acidic sludge to provide non-hygroscopic ammonium phosphate. The filtrate provides an ammonium polyphosphate fertilizer solution which does not precipitate magnesium-containing solids.

BACKGROUND OF THE INVENTION

This invention relates to ammonium phosphate fertilizers, and in particular to a new non-hygroscopic ammonium phosphate fertilizer containing magnesium and other secondary nutrients, and to the process for the preparation thereof.

"Wet-process" phosphoric acid of commerce is manufactured by a process which, in essence, consists of treating phosphate rock (essentially calcium phosphate) with sulfuric acid, whereby there is formed free phosphoric acid and calcium sulfate. The latter, being insoluble, is separated from the acid by filtration. While this process is simple in concept, it is fraught with many technical difficulties and complications, and the resultant phosphoric acid is a highly impure material, containing relatively large amounts of dissolved sulfates and smaller amounts of fluorides, fluosilicates and other salts of aluminum, magnesium, iron and other metals, as well as suspended organic matter. When the acid is concentrated to say 50% $P_2O_5$ content, these impurities precipitate and settle out as solids or sludge at a slow rate occurring over an interval of several days and even weeks. The amount of total solids which settles out varies, generally from 0.5 to 10 percent by weight of acid, and the composition varies during aging of the acid.

The most common method used for cleanup of the 50% $P_2O_5$ wet-process phosphoric acid has been ponding, whereby the acid is run out into large ponds and allowed to settle for a long period of time, for example, 1–3 weeks, until most of the insoluble materials have settled to the bottom of the pond as a sludge. The sludge, which is periodically discarded by scraping the pond, amounts to an appreciable part of the phosphate content of the crude acid. However, no appreciable amount of magnesium, the most detrimental impurity to stability of stored ammonium polyphosphate solutions, is removed by ponding.

So-called superphosphoric acid containing at least 66% $P_2O_5$ content may be economically prepared by evaporating water from wet-process phosphoric acid. The term superphosphoric acid as used in this application is defined as phosphoric acid containing substantial quantities of both ortho- and polyphosphoric acids. These polyphosphoric acids include pyrophosphoric acid and other linear polymers.

2

Ammonium polyphosphate solutions made from wet-process phosphoric acid normally contain metal impurities including iron, aluminum and magnesium. Of these, magnesium occurs in smallest concentration but it has the most deleterious effect on the stability of the ammonium polyphosphate solutions. Commercial ammonium polyphosphate solutions for fertilizer use normally are made with 45–65% of their $P_2O_5$ content as polyphosphate. It has been found that such solutions containing a $Mg/P_2O_5$ ratio of 0.0056 will precipitate magnesium-containing solids in about 4 months at ambient temperatures. It has further been found that such solutions containing a $Mg/P_2O_5$ ratio of 0.002 or less will not precipitate such solids for 6–12 months or longer.

It is known that iron and aluminum ions, which are the predominant impurities in wet-process phosphoric acid, form gelatinous precipitates which render ammonium salt solutions prepared therefrom thixotropic and gelatinous. Other metal ions incident as impurities in wet-process phosphoric acid such as copper, chromium, magnesium, zinc ions, etc., form granular precipitates in ammoniacal solutions. U.S. Pat. 3,044,851 discloses that the formation of gelatinous iron and aluminum precipitates can be prevented by heating the acid to expel the volatile impurities and thereafter forming acyclic polyphosphoric acid in the acid. The other metal impurities in the acid can be allowed to precipitate and be separated therefrom by a simple settling, centrifuging, or filtering step; preferably, however, the precipitation of these metals is also prevented by forming in the acid an additional quantity of the acyclic polyphosphoric acid.

However, U.S. Pat. 3,044,851 discloses that magnesium requires a far higher concentration of acid to prevent precipitation than the same amount of other metal impurities. On a molal basis, an atomic weight of magnesium requires six times as many atomic weights of phosphorus as polyphosphoric acid than does an atomic weight of iron or aluminum. The selective removal of one atomic weight of magnesium would, therefore, reduce the content of acyclic polyphosphoric acid six times the reduction obtained by the removal of one atomic weight of iron or aluminum. The selective removal of magnesium can be accomplished in any suitable manner, for instance, by ion exchange or by electrodeposition of the magnesium. To impart selectivity to the latter method for magnesium, a suitable membrane which is permeable only to magnesium ions can be placed about the cathode cell.

U.S. Pat. 3,044,851 further discloses that magnesium can be selectively removed from the dilute wet process acid by passing the acid over a cation exchange resin at suitable conditions, e.g., atmospheric pressure and ambient temperature.

U.S. patent application Ser. No. 699,724 of J. E. Sansing et al., filed Sept. 22, 1967, provides a preferred method for lowering the magnesium content of ammonium polyphosphate solutions, which includes the steps of mixing aqueous ammonia with superphosphoric acid at a temperature greater than 70° C. to provide a $N/P_2O_5$ ratio of 0.37–0.45; cooling and maintaining the mixture at 45–65° C. until at least 5% solids precipitate, which are separated; and then adjusting the $N/P_2O_5$ ratio of the solution to 0.27–0.35. The resulting ammonium polyphosphate solution has less than 0.20% MgO and is useful as a fertilizer solution.

U.S. Pat. 3,243,279 provides a process for preparing a hard non-hygroscopic ammonium phosphate solid which includes the steps of neutralizing an oxide impurity-containing superphosphoric acid with ammonia at 75–500° C. to provide an $N/P_2O_5$ ratio of at least 0.14, and then cooling the reaction mixture to room temperature to solidify the reaction mass. However, this process does not coproduce the valuable ammonium polyphosphate solution as does the instant invention, and does not provide for an efficient manner of utilizing the sludge obtained by settling the crude phosphoric acid.

SUMMARY OF THE INVENTION

It has been found that non-hygroscopic ammonium phosphate can be obtained by (a) Settling crude wet process phosphoric acid at 60–100° C. to obtain an acidic sludge and purified phosphoric acid;

(b) Removing water from said purified phosphoric acid to prepare superphosphoric acid containing 66–76% $P_2O_5$;

(c) Mixing said superphosphoric acid with aqueous ammonia at a temperature greater than 70° C. to provide a solution having an $N/P_2O_5$ ratio of 0.37–0.45;

(d) Maintaining said solution at 45–65° C. until at least 5% solids precipitate;

(e) Separating said solids from the solution;

(f) Adjusting the $N/P_2O_5$ ratio of the resulting solution to 0.27–0.37 to provide an ammonium polyphosphate solution having a low magnesium content;

(g) Neutralizing said precipitated solids with said acidic sludge to a pH 5–6; and (h) Drying the resulting neutralized mixture to provide a non-hygroscopic ammonium phosphate composition.

The product of this process, which is rich in magnesium and ammonium polyphosphates, is useful as a fertilizer and thus provides a method for utilizing all the $P_2O_5$ content of crude wet process phosphoric acid in the production of valuable fertilizer products.

DETAILED DESCRIPTION OF THE INVENTION

The precipitated solids which are neutralized in the instant invention are that material which is separated from the reaction solution in the process of aforesaid U.S. Serial No. 669,724. The acidic sludge which is used to neutralize the composition is that obtained by settling crude wet process phosphoric acid. It has been found that both these ingredients of the instant process can be prepared by a single overall process whereby all the $P_2O_5$ content of crude wet process phosphoric acid is utilized.

For this purpose, wet process phosphoric acid, preferably containing 50–55% $P_2O_5$, is maintained at 65–100° C., preferably at 80–90° C., until about 5–15% (by weight) of the crude acid has settled as sludge. This normally requires about 1–6 days. The clarified acid is separated from the sludge and is dehydrated to afford superphosphoric acid, which contains about 66–76% $P_2O_5$, preferably 68–73%. About 50–70% of the $P_2O_5$ is polyphosphate.

The superphosphoric acid is then reacted with aqueous ammonia at a temperature greater than about 70° C., preferably at 85–100° C., to produce an "overammoniated" solution of pH 7.5–8.6. The ammonia is preferably 20–45% concentration and is added in an amount to provide a $N/P_2O_5$ ratio of 0.37–0.45, preferably 0.39–0.45.

It is preferred that the reaction mixture of ammonia and superphosphoric acid have a water content of at least about 20%, preferably 35%, based on the weight of solution use. The water content is kept at this level so as to prevent an excessive amount of diammonium phosphate from precipitating.

A solution of ammonium polyphosphate having a $Mg/P_2O_5$ ratio greater than 0.002 could be used in the instant invention, but the process described hereinabove is obviously preferred since it also provides for the preparation of the required sludge.

The overammoniated solution is cooled to 45–65° C., preferably 55–65° C., and maintained at this temperature until at least 5% solids, based on the weight of the total mixture, precipitate. Preferably, the temperature will be maintained until about 25% solids precipitate. Precipitation of less than 5% solids will not reduce the magnesium level of the solution to the desired level, while precipitation of more than about 25% is not effective in removing additional magnesium. In general, the temperature will be maintained for at least 6 hours, and usually for 12 hours or longer to afford the desired precipitation. The temperature should be maintained no lower than 45° C. to prevent solidification of the entire reaction mass in the manner taught by aforesaid U.S. Patent 3,243,279. Complete solidification of the reaction mass affords a product of substantially different composition and properties from the non-hygroscopic product of the instant invention. It also prevents co-production of an ammonium polyphosphate solution in the manner described hereinafter.

The precipitated solids include diammonium phosphate, magnesium ammonium pyrophosphate and other metal phosphates. These alkaline solids are separated from the solution by any of several methods familiar to those skilled in the art, with filtration being preferred since it entails very little loss of material. The solution may then be treated in a manner described hereinafter to afford a valuable composition.

The separated alkaline solids, which constitute an ammonium phosphate mixture are then neutralized to pH 5–6 with the sludge obtained hereinbefore by settling crude wet process phosphoric acid. Normally, this is accomplished by mixing about 2 to 5 parts by weight of the ammonium phosphate composition with about 1 part by weight of sludge. The resulting mixture is then dried, for example by heating at 60–90° C. to afford a non-hygroscopic ammonium phosphate fertilizer composition which is rich in magnesium and other secondary nutrients. When reconstituted with water, this composition has a pH of about 5–6.

The non-hygroscopic fertilizer composition of the instant invention includes about 50–58% $P_2O_5$ (of which about 20–40% is polyphosphate); about 13–17% ammonium ion; about 3–4.5% magnesium oxide; about 1.5–2.5% aluminum oxide; about 3–4% ferric oxide $Fe_2O_3$; and about 3–5% sulfate ion. The composition is much less hygroscopic than ordinary ammonium phosphate fertilizers available heretofore.

The solution from which the precipitated ammonium phosphate mixture is removed may be converted to a valuable fertilizer composition, thus providing for complete utilization of the phosphate content of the original crude wet process phosphoric acid. For this purpose, the $N/P_2O_5$ ratio of the solution is adjusted to about 0.27–0.35, preferably 0.28–0.32; by vaporization of ammonia and/or addition of phosphoric acid. The pH of the resulting solution should be within the range of about 5.7–6.4, preferably 5.9–6.2. Water is then added to provide an ammonium polyphosphate fertilizer solution which will not precipitate magnesium-containing solids within 6–12 months or longer. This solution contains less than 0.20% magnesium oxide, preferably less than 0.10%, and has a $Mg/P_2O_5$ ratio less than 0.002.

The following examples are provided to more fully illustrate the instant invention. They are provided for illustrative purposes only and are not to be construed as limiting the instant invention, which is defined by the appended claims. All parts and percents in the examples are by weight unless indicated otherwise.

EXAMPLE I

Phosphoric acid was produced in accordance with conventional procedures by reaction of sulfuric acid with phosphate rock. By-product gypsum was largely removed by filtration from the weak phosphoric acid which had a $P_2O_5$ content of about 30%. This weak phosphoric acid was then concentrated to 50–54% $P_2O_5$ content by evaporation, resulting in the following analysis:

| Component: | Weight percent |
|---|---|
| $P_2O_5$ | 52.30 |
| $H_2SO_4$ | 5.00 |
| $Al_2O_3$ | 1.35 |
| $Fe_2O_3$ | 2.20 |
| MgO | 0.80 |

The acid was then sent to a stainless steel storage tank, which was equipped with a sludge rake, where it was stored for 3 days at 60° C. To facilitate settling of the sludge which formed, Separan NP–10 (a synthetic polymer formed by polymerization of acrylamide, of molecular weight about one million) was added in the amount of 5 p.p.m. The sludge, which was gelatinous and essentially unfilterable, was continuously raked to the bottom discharge port of the storage tank. It had the following analysis:

| Component: | Weight percent |
|---|---|
| $P_2O_5$ | 41.20 |
| $K_2O$ | 1.40 |
| $Al_2O_3$ | 3.77 |
| $Fe_2O_3$ | 6.00 |
| $CaSO_4$ | 1.68 |
| $H_2SO_4$ | 2.79 |

The clarified phosphoric acid which remained in the tank had the following analysis:

| Component: | Weight percent |
|---|---|
| $P_2O_5$ | 53.00 |
| $H_2SO_4$ | 5.03 |
| MgO | 0.86 |
| $Fe_2O_3$ | 1.91 |
| $Al_2O_3$ | 1.16 |

This clarified phosphoric acid was sent directly to a superphosphoric acid reactor at a rate of 92.8 pounds per hour, where it was dehydrated to superphosphoric acid by direct treatment with combustion gases from burning natural gas. Water, amounting to 22.11 pounds per hour, and fluorides amounting to 2.2 pounds of fluorine per hour are removed with combustion gases along with about 0.35 $P_2O_5$ pound per hour carried over as spray. Temperature of gas stream just above acid injection point was about 290° C.

Superphosphoric acid was continuously withdrawn from reactor. Most of the impurities were sequestered but some were preesnt as undissolved slurry. Analysis of superphosphoric acid, which was withdrawn at rate of 68.2 pounds per hour, was as follows:

| Component: | Weight percent |
|---|---|
| $P_2O_5$ | 72.00 |
| $H_2SO_4$ | 6.86 |
| $Fe_2O_3$ | 2.60 |
| $Al_2O_3$ | 1.58 |
| MgO | 1.17 |

The superphosphoric acid was reacted with aqua ammonia at 90° C. and 15 p.s.i.g. pressure in an overammoniation reactor consisting of a circulating tank constructed by means of a simple stainless steel T to provide a $N/P_2O_5$ ratio of 0.41. The pH of the solution was maintained at 8.5. Most of the ammonia was supplied for the overammoniation reaction by adding 43.6 pounds per hour of 42% aqua ammonia. In addition, recycle aqua ammonia (20% ammonia) from stripping operations was sent to the overammoniation reactor at rate of 30.3 pounds per hour.

The resulting overammoniated ammonium polyphosphate solution was cooled to 60° C. and sent to a hold tank where it was held for 24 hours at 60° C. During this hold period, the magnesium impurity was precipitated, in part as magnesium ammonium pyrophosphate, along with some of the other metal impurities and ammonium phosphates. The total solids constituted 14% of the solution. The resulting slurry had the following analysis:

| Component: | Weight percent |
|---|---|
| $P_2O_5$ (60.0% as polyphosphate) | 34.48 |
| $NH_3$ | 17.16 |
| $Al_2O_3$ | 0.76 |
| $Fe_2O_3$ | 1.25 |
| MgO | 0.56 |
| $H_2SO_4$ | 3.29 |

The slurry was sent to a solid bowl decanter-type centrifuge at the rate of 142.1 pounds per hour, where the precipitated solids were separated from the solution. The precipitated solids had the following analysis:

| Component: | Weight percent |
|---|---|
| $P_2O_5$ (68.0% as polyphosphate) | 39.6 |
| $NH_3$ | 14.9 |
| MgO | 3.5 |
| $H_2SO_4$ | 2.9 |
| $Al_2O_3$ | 0.7 |
| $Fe_2O_3$ | 1.1 |

The precipitated solids and aforesaid sludge from the crude phosphoric acid were then continuously fed into a reactor-granulator, which was a rotary drum 2 feet in diameter and 10 feet long containing 4 longitudinal lifts each 2 inches wide. The dam at the discharge end of the reactor-granulator was 4 inches deep and reactor pitch was 6 inches/10 feet. Rotational velocity was 12 r.p.m. and temperature was maintained at 55–65° C. by heating recycled solids. The ratio of precipitated solids fed into the reactor-granulator was about 3.6 parts per one part of acidic sludge.

About 5 pounds of solids heated to 90° C., were recycled per pound of material fed into the granulator-reactor, with the excess being continuously removed by overflowing the dam. This overflow of solids was then passed through a Fitz mill grinder to reduce the particle size from about 16 mesh size to about 6–12 mesh size.

The resulting material was a non-hygroscopic ammonium phosphate composition having the following analysis:

| Component: | Weight percent |
|---|---|
| $P_2O_5$ (40% polyphosphate) | 55.80 |
| $NH_3$ | 16.84 |
| MgO | 3.96 |
| $H_2SO_4$ | 4.36 |
| $Al_2O_3$ | 2.27 |
| $Fe_2O_3$ | 3.69 |

Phosphate availability (citrate solubility) of the solid product was 99.5% and water solubility of the $P_2O_5$ in the solid product was 63%. Loss in nonorthophosphate to orthophosphate during granulation was about 15%. Condition of the solid product relative to storage and flow properties was excellent even without coating and the product was suitable for direct use as fertilizer without further treatment.

The solid product was not hygroscopic. A sample was treated with moist air (80% relative humidity) at 80° F. for seven days in comparison with commercial solid diammonium phosphate. The commercial material absorbed three times as much moisture as did the product of this invention.

The overammoniated ammonium polyphosphate solution obtained from the centrifugation step had the following analysis:

| Component: | Weight percent |
|---|---|
| $P_2O_5$ (58.0% as polyphosphate) | 34.30 |
| $NH_3$ | 17.40 |
| MgO | 0.08 |
| $Al_2O_3$ | 0.78 |
| $Fe_2O_3$ | 1.26 |
| $H_2SO_4$ | 3.34 |

This solution was sent to an ammonia stripper at the rate of 123.2 pounds per hour. The stripper, a carbon steel tower packed with carbon steel rings equivalent to two theoretical plates, was operated at atmospheric pressure with no external reflux. Distillate temperature was 98–101° C. Steam was injected directly into the solution in the stripper at a rate of 32.2 pounds per hour. Ammonium polyphosphate solution was continuously withdrawn at rate of 125.2 pounds per hour as aqueous polyphosphate-containing product of pH 6.2, having the following analysis:

| Component: | Weight percent |
|---|---|
| $P_2O_5$ | 33.70 |
| $NH_3$ | 12.25 |
| $Al_2O_3$ | 0.76 |
| $Fe_2O_3$ | 1.24 |
| MgO | 0.07 |
| $H_2SO_4$ | 3.28 |

This ammonium polyphosphate solution is then adjusted according to the manner taught in aforesaid Ser. No. 669,724 to provide a final fertilizer solution. The resulting product was ammonium polyphosphate fertilizer solution with low magnesium content and excellent storage qualities. Thus, overall $P_2O_5$ recovery from the crude phosphoric acid was 99.3%.

What is claimed is:

1. A process for preparing a non-hygroscopic ammonium phosphate composition from precipitated solids wherein said solids are obtained by:
    (a) settling crude wet process phosphoric acid at 60–100° C. to obtain an acidic sludge and purified phosphoric acid,
    (b) removing water from said purified phosphoric acid to prepare superphosphoric acid containing 66–76% $P_2O_5$,
    (c) mixing said superphosphoric acid with aqueous ammonia at a temperature greater than 70° C. to provide a solution having a $N/P_2O_5$ ratio of 0.37–0.45,
    (d) maintaining said solution at 45–65° C. until at least 5% solids precipitate, and
    (e) separating said solids from the solution;
which process comprises neutralizing said precipitated solids to pH 5–6 with said acidic sludge, to procure an ammonium phosphate composition, and then drying the resultant composition.

2. The process of claim 1 wherein the temperature of said solution in step (c) is prepared by mixing aqueous ammonia and superphosphoric acid at 85–100° C.

3. The process of claim 1 wherein said solution in step (c) is prepared by mixing 20–45% aqueous ammonia and superphosphoric acid containing 66–76% $P_2O_5$.

4. The process of claim 1 wherein said crude phosphoric acid in step (a) contains 50–55% $P_2O_5$ and is settled at 65–100° C.

5. The process for preparing a non-hygroscopic ammonium phosphate composition from a precipitated solid obtained by:
    (a) settling crude wet process phosphoric acid containing 50–55% $P_2O_5$ at 80–90° C. to obtain an acidic sludge and purified phosphoric acid;
    (b) removing water from said purified phosphoric acid to prepare superphosphoric acid containing 68–73% $P_2O_5$;
    (c) mixing said superphosphoric acid with 20–45% aqueous ammonia at 85–100° C. to provide a solution having a $N/P_2O_5$ ratio of 0.39–0.45;
    (d) maintaining said solution at 55–65° C. until about 25% solids precipitate; and
    (e) separating said solids from the solution, which process comprises neutralizing said precipitated solid to pH 5–6 with said acidic sludge, and then drying the neutralized composition.

6. A process for preparing ammonium polyphosphate solution having a low magnesium content and a non-hygroscopic ammonium phosphate composition which comprises the steps:
    (a) settling crude wet process phosphoric acid at 60–100° C. to obtain an acidic sludge and purified phosphoric acid;
    (b) removing water from said purified phosphoric acid to prepare superphosphoric acid containing 66–76% $P_2O_5$;
    (c) mixing said superphosphoric acid with aqueous ammonia at a temperature greater than 70° C. to provide a solution having a $N/P_2O_5$ ratio of 0.37–0.45;
    (d) maintaining said solution at 45–65° C. until at least 5% solids precipitate;
    (e) separating said solids from the solution;
    (f) adjusting the $N/P_2O_5$ ratio of the resulting solution to 0.27–0.37 to provide an ammonium polyphosphate solution having a low magnesium content;
    (g) neutralizing said precipitated solids with said acidic sludge to a pH 5–6; and
    (h) drying the resulting neutralized mixture to provide a non-hygroscopic ammonium phosphate composition.

7. The process of claim 6 wherein said crude phosphoric acid contains 50–55% $P_2O_5$.

8. The process of claim 6 wherein said mixing step comprises mixing superphosphoric acid containing 68–73% $P_2O_5$ with 20–45% aqueous ammonia at 85–100° C. to provide a solution having a $N/P_2O_5$ ratio of 0.39–0.42.

9. The process for preparing ammonium polyphosphate solution having a low magnesium content and a non-hygroscopic ammonium phosphate composition which comprises the steps:
    (a) settling crude wet process phosphoric acid containing 50–55% $P_2O_5$ at 80–90° C. to obtain an acidic sludge and purified phosphoric acid;
    (b) removing water from said purified phosphoric acid to prepare superphosphoric acid containing 68–73% $P_2O_5$;
    (c) mixing said superphosphoric acid with 20–45% aqueous ammonia at 85–100° C. to provide a solution having a $N/P_2O_5$ ratio of 0.39–0.45;
    (d) maintaining said solution at 55–65° C. until about 25% solids precipitate;
    (e) separating said solids from the solution;
    (f) adjusting the $N/P_2O_5$ ratio of the resulting solution to 0.28–0.32 to provide an ammonium polyphosphate solution having a low magnesium content;
    (g) neutralizing said precipitated solids with said acidic sludge to a pH 5–6; and
    (h) drying the resulting neutralized mixture to provide a non-hygroscopic ammonium phosphate composition.

References Cited

UNITED STATES PATENTS

| 2,891,856 | 6/1959 | Getsinger et al. | 71—43 |
| 3,290,140 | 12/1966 | Young | 71—34 |

REUBEN FRIEDMAN, Primary Examiner

C. N. HART, Assistant Examiner

U.S. Cl. X.R.

71—43